(12) United States Patent
De Oliveira et al.

(10) Patent No.: US 10,699,021 B2
(45) Date of Patent: Jun. 30, 2020

(54) METHOD AND A DEVICE FOR SECURE STORAGE OF AT LEAST ONE ELEMENT OF DIGITAL INFORMATION, AND SYSTEM COMPRISING SUCH DEVICE

(71) Applicant: INESC TEC—Instituto de Engenharia de Sistemas e Computadores, Tecnologia e Ciência, Oporto (PT)

(72) Inventors: Rui Carlos Mendes De Oliveira, Oporto (PT); João Tiago Medeiros Paulo, Oporto (PT); Francisco Miguel Carvalho Barros Da Cruz, Oporto (PT); Francisco António Ferraz Martins De Almeida Maia, Oporto (PT)

(73) Assignee: INESC TEC—Institute de Engenharia de Sistemas e Computadores, Tecnologia e Ciência, Oporto (PT)

(*) Notice: Subject to any disclaimer, the term of this patent is extended or adjusted under 35 U.S.C. 154(b) by 148 days.

(21) Appl. No.: 15/713,763

(22) Filed: Sep. 25, 2017

(65) Prior Publication Data
US 2019/0095628 A1   Mar. 28, 2019

(51) Int. Cl.
*G06F 21/60* (2013.01)
*H04L 9/08* (2006.01)
(Continued)

(52) U.S. Cl.
CPC ........ *G06F 21/602* (2013.01); *G06F 21/6218* (2013.01); *G06F 21/78* (2013.01);
(Continued)

(58) Field of Classification Search
CPC .... G06F 21/602; G06F 21/6218; G06F 21/78; H04L 9/30; H04L 9/14; H04L 9/08;
(Continued)

(56) References Cited

U.S. PATENT DOCUMENTS

| 7,315,950 B1* | 1/2008 | Baransky | ............... G06F 21/10 |
| | | | 713/193 |
| 2003/0149869 A1* | 8/2003 | Gleichauf | ............... H04L 45/50 |
| | | | 713/153 |

(Continued)

OTHER PUBLICATIONS

Ralph C. Merkle, "On the Security of Multiple Encryption", Communications of the ACM, Jul. 1981, vol. 24, No. 7, 3 pages (Year: 1981).*

(Continued)

*Primary Examiner* — Chau Le
*Assistant Examiner* — Han Yang
(74) *Attorney, Agent, or Firm* — Mark M. Friedman

(57) ABSTRACT

The present invention is enclosed in the field of digital information storage, specifically digital information storage with complies with high security and privacy requirements. It is an object of the present invention a method for secure storage of at least one element of digital information (201), comprising i) ciphering with at least one ciphering key (202) said at least one element of digital information (201) into a ciphered element of digital information (203) and ii) transmitting said ciphered element of digital information (203) and said at least one ciphering key (202) to a domain (2) (204) from a plurality of domains (2) (204) for subsequent storage, wherein said ciphered element of digital information (203) and said at least one ciphering key (202) are transmitted to different domains (2) (204). Such method may be implemented by a system comprising client devices and a front-end server.

12 Claims, 1 Drawing Sheet

(51) Int. Cl.
    *G06F 21/62*     (2013.01)
    *H04L 9/14*     (2006.01)
    *G06F 21/78*     (2013.01)
    *H04L 9/30*     (2006.01)
    *H04L 9/06*     (2006.01)
    *H04L 29/08*     (2006.01)
    *H04L 29/06*     (2006.01)

(52) U.S. Cl.
    CPC ............. H04L 9/0656 (2013.01); H04L 9/08 (2013.01); H04L 9/085 (2013.01); H04L 9/0894 (2013.01); H04L 9/14 (2013.01); H04L 9/30 (2013.01); *H04L 9/06* (2013.01); *H04L 63/0428* (2013.01); *H04L 63/06* (2013.01); *H04L 63/061* (2013.01); *H04L 63/083* (2013.01); *H04L 63/10* (2013.01); *H04L 67/1097* (2013.01)

(58) Field of Classification Search
    CPC ..... H04L 67/1097; H04L 63/10; H04L 63/06; H04L 9/06; H04L 9/0656; H04L 9/0894; H04L 9/085; H04L 63/0428; H04L 63/083; H04L 63/061

See application file for complete search history.

(56) References Cited

U.S. PATENT DOCUMENTS

| | | | | |
|---|---|---|---|---|
| 2010/0011226 | A1* | 1/2010 | Inagaki | G06F 21/10 713/189 |
| 2012/0324242 | A1* | 12/2012 | Kirsch | G06Q 20/0855 713/189 |
| 2015/0302057 | A1* | 10/2015 | Kealey | G06F 16/951 707/768 |
| 2017/0323114 | A1* | 11/2017 | Egorov | G06F 21/602 |

OTHER PUBLICATIONS

Ludwig Seitz, "Key management for encrypted data storage in distributed systems", Proceedings of the Second IEEE International Security in Storage Workshop (SISW'03), 2003, 11 pages (Year: 2003).*

* cited by examiner

METHOD AND A DEVICE FOR SECURE STORAGE OF AT LEAST ONE ELEMENT OF DIGITAL INFORMATION, AND SYSTEM COMPRISING SUCH DEVICE

FIELD OF THE INVENTION

The present invention is enclosed in the field of digital information to storage, specifically digital information storage which complies with high security and privacy requirements.

PRIOR ART

Public online cloud-based storage services are nowadays the de facto standard for users to store their photos, music and other types of documents online. The extremely low economic barrier of these services (which typically offer free basic accounts), their ubiquitous availability, as well as their ease of use with transparent client integration contribute to making them an attractive solution for both individuals and organizations.

In such prior art solutions, as soon as the data enters the cloud provider's service perimeter, the client essentially surrenders control over it, which is highly undesirable. In fact, the control over personal data is among the major concerns of individuals and organizations. As a consequence, concerns over the disclosure of private information by malicious insiders and data breaches have motivated a new class of secure and safe cloud-based storage applications and services. This trend is further amplified by the lack of security expertise from software developers.

To protect the privacy of the users and their data, systems are known for encrypting data at the client side before sending it to the cloud providers. These systems offer various security guarantees to the end-users (e.g., integrity, authorization, privacy) and typically follow two different deployment strategies: single- or multi-cloud modes. The former stores data on a single storage provider, while the latter spreads it across multiple providers, possibly operating under distinct (non-colluding) administrative domains. Partitioning data across multiple storage providers ensures that, even if one of them is compromised, the attacker cannot access the complete original information. However, prior art methods fail to guarantee that no information from the original data is leaked as long as one of the storage providers remains secure. Moreover, such systems resort to traditional encryption schemes, which usually require access to an encryption key management service. This is usually a specialized third-party service where users store their encryption keys for cyphering and deciphering their sensitive data stored on the cloud.

Further, methods based exclusive-OR ciphering are known, as is the case of patent application US2003149869, disclosing a method and system for securely transmitting data which will subsequently be deciphered and stored. A single sending host uses such scheme for ciphering the information, which subsequently sends to a receiving host, which deciphers the information and subsequently stores it, deciphered. However, such operation is merely performed as single step of ciphering and subsequent storage, and only for transmission purposes, in a single remote domain (the receiving host), therefore being susceptible of attacks.

The present solution innovatively overcomes the referred issues.

SUMMARY OF THE INVENTION

It is therefore an object of the present invention a method for secure storage of at least one element of digital information (201) wherein it comprises the following steps:
i) ciphering with at least one ciphering key (202) said at least one element of digital information (201) into a ciphered element of digital information (203);
ii) transmitting said ciphered element of digital information (203) and said at least one ciphering key (202) to a domain (2) (204) from a plurality of domains (2) (204) for subsequent storage, wherein said ciphered element of digital information (203) and said at least one ciphering key (202) are transmitted to different domains (2) (204).

Such method enables to provide storage of the element of digital information (201) (in a ciphered format) and the ciphering key(s) which cipher it throughout several domains (2) (204) therefore increasing security, for an attacker will need to gather the information from the at least two different domains (2) (204) in order to have access to the element of digital information (201). Such domains (2) (204) are functionally equivalent. Only in a case of colluding of the two or more domains (2) (204) would the attacker gain access to the information. An attack gaining access to the information in a single domain, even if to the entirety of the information stored in such domain, is not sufficient to provide access to a single element of digital information (201).

In an advantageous configuration of the secure storage method above described, step i) comprises ciphering with n ciphering keys (202), said step (ii) comprises transmitting each of the ciphered element of digital information (203) and said n ciphering keys (202) to n+1 different domains (2) (204), n consisting of an integer greater than 0. Hence, the greater is n, the higher is the security level. As above referred, an attacker will have to gain access to n+1 domains (2) (204) in order to gain access to the original element of digital information (201).

Preferably, the ciphering of step i) consists of ciphering said at least one element of digital information (201) with at least one pseudo-random key, thereby obtaining a ciphered element of digital information (203).

In an improved mode of the described method of the present invention, said ciphering consists specifically of ciphering said at least one element of digital information (201) with at least two pseudo-random keys, wherein:
a first pseudo-random key ciphers the element of digital information (201) and
any subsequent pseudo-random key ciphers the result of the ciphering with the previous pseudo-random key,
the resulting ciphered piece of digital information and each of said at least two ciphering keys (202) being transmitted in step ii) to at least three different domains. The element of digital information (201) is thus repeatedly ciphered, thereby increasing the security in n+1 levels.

In an improved configuration of the method of the present invention, the ciphering of step i) consists of performing an exclusive-OR operation, each ciphering key (202) consisting of a pseudo-random bit stream. Preferably, said exclusive-OR operation is specifically performed in each bit of:
the element of digital information (201) with a ciphering key (202) or
the resulting ciphered element of digital information (203) with a previous ciphering key (202) with bits from said subsequent ciphering key.
Such provides a compact and reliable method of both increasing the security level (n ciphering steps) and delivering a plurality of elements which are subsequently stored in n+1 different domains (2) (204) (the final ciphered element of digital information (203) and each ciphering key).

Further, for an improved operation of the above described method, said pseudo-random bit stream working as a key is used a single time for an exclusive-OR operation. This configuration of the method of the present invention enables an increased security when using insecure domains (2) (204), thereby avoiding that the ciphering key (202) which was used to cipher an element of digital information (201) and subsequently stored in a domain is not used once again for another element of digital information (201).

In another improved embodiment of the above described method of the present invention, for each element of digital information (201), at least one metadata element is generated, such metadata element comprising at least one additional information indicating a creation or modification action of such element of digital information (201). Such allows to provide the basis for a synchronization scheme in which one or more devices may retrieve the information stored throughout the multiple domains (2) (204), while maintaining the security. This means that data is accessible without the need of direct communication between several devices wishing to have access to an element of digital information (201)—having the correct credentials to it—, such case being known in prior art as completely client-side. Prior art systems require a specialized backend service for data synchronization across multiple devices. In this embodiment, data is synchronized while being stored on third-party storage domains that do not necessary have this specialization.

Preferably, each metadata element is ciphered with said at least one ciphering key, resulting into a ciphered metadata element, such ciphered metadata element being subsequently transmitted to a domain (2) (204) from said a plurality of domains (2) (204) for subsequent storage. Hence, the metadata elements go through the same process as the actual element of digital information (201), thereby increasing security over the additional information of the metadata.

In an improved mode of the method of the present invention, each metadata element is associated with a unique identifier. Preferably, such unique identifier is associated with a username and a corresponding device identifier, such device identifier consisting of an identifier of a device which generated or altered an element of digital information (203). Such scheme provides for the ability to synchronize data—elements of digital information, ciphering keys, metadata elements—throughout several devices without resorting to specialized services which guarantee such action. In such prior art case, a backend must know which devices and metadata are being used.

It is yet an object of the present invention a device for secure storage of at least one element of digital comprising computational means and communication means, wherein:
  i) the computational means are configured to cipher said at least one element of digital information (201) with at least one ciphering key, resulting in a ciphered element of digital information (203) and
  ii) the communication means are configured to transmit said at least one ciphering key (202) and ciphered element of digital information (203) to a domain (2) (204) from a plurality of domains (2) (204) for subsequent storage, wherein the communication means are further configured to transmit said ciphered element of digital information (203) and said at least one ciphering key (202) to different domains (2) (204).

Such device provides, as the above described method for secure storage, to provide storage of an element of digital information (201) (in a ciphered format) and ciphering key(s) which cipher it throughout several domains (2) (204) therefore increasing security, for an attacker will need to gather the information from the at least two different domains (2) (204) in order to have access to the element of digital information (201). Only in a case of colluding of the two domains (2) (204) would the attacker gain access to the information. An attack gaining access to the information in a single domain, even if to the entirety of the information stored in such domain, is not sufficient to provide access to a single element of digital information (201).

In several embodiments of the device of the present invention, it is further configured to implement the method for secure storage of at least one element of digital information (201) of the present invention, in any of its described embodiments.

It is also an object of the present invention a system (1) for secure storage of at least one element of digital information (201) of the client comprising comprises at least one client device (3) and a plurality of domains (2) (204), wherein:
  the at least one client device (3) consists of the device of claim 14 and
  the domains (2) (204) are configured to store the ciphered element of digital information (203) and said at least one ciphering key, such domains (2) (204) preferably consisting of untrusted domains.

DETAILED DESCRIPTION OF THE INVENTION

Figure 1:
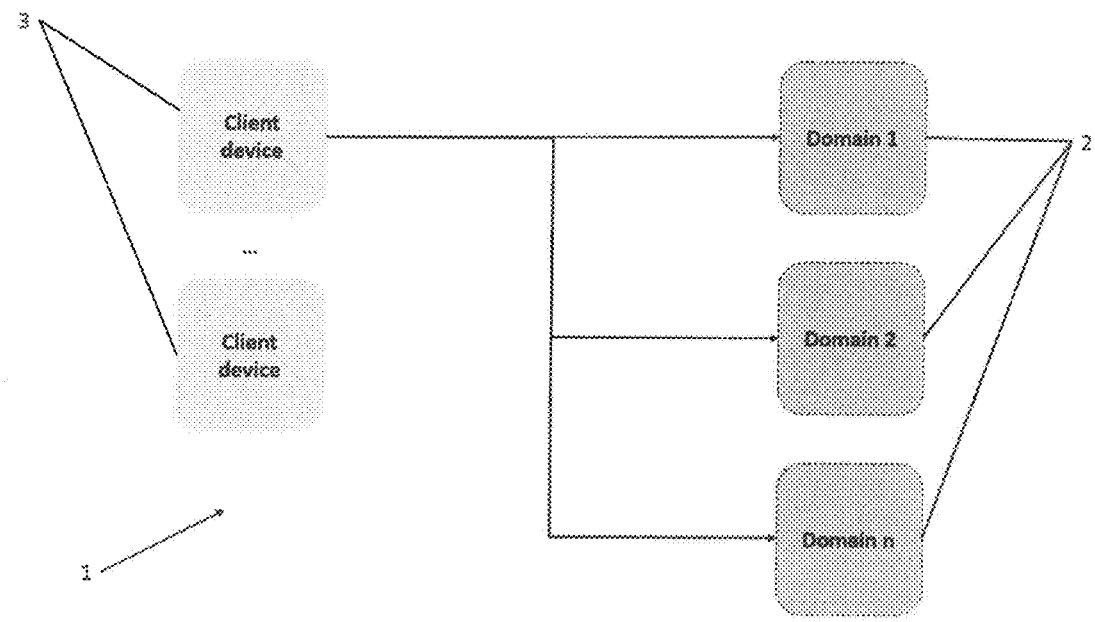
FIG. 1—representation of an embodiment of the system (1) of the present invention, presenting two client devices (3) in communication with several domains (2) (204), either for storing or obtaining stored information—elements of digital information or ciphered elements of digital information, and respective ciphering keys (202).
Figure 2:
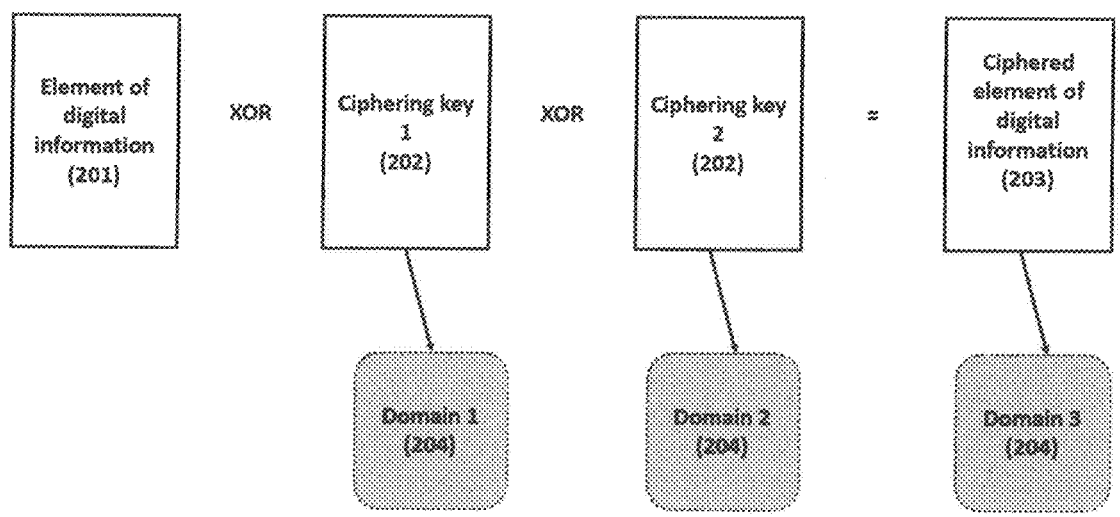
FIG. 2—representation of an embodiment of the method of the present invention with n=2, i.e., three domains (2) (204) and two ciphering keys (202). The element of digital information (201) is repeatedly ciphered with the ciphering keys (202) until a cyphered element of digital information (201) is obtained. Each of the two ciphering keys (202) and the cyphered element of digital information (201) are transmitted and subsequently stored in each of the three domains (2) (204).

The more general advantageous embodiments of the present invention are described in the Summary of the invention. These embodiments are subsequently detailed, according to other advantageous and/or preferred embodiments of the objects of the present invention.

In a preferred embodiment of the method for secure storage of the present invention, access to:
  a ciphered element of digital information (203) stored in a domain (2) (204), corresponding to an element of digital information (201),
  said at least one ciphering key (202) stored in a different domain (2) (204) and
  the plurality of metadata lists corresponding to an element of digital information (201) stored in a domain (2) (204)

is provided by means of an access identifier. Preferably, such access identifier is associated with said username which is part of the unique identifier and a corresponding password.

In another preferred embodiment of the method of the present invention, steps i) and ii) are performed in a trusted device, and said plurality of domains consists of a plurality of untrusted domains.

In yet another preferred embodiment of the method of the present invention, the element of digital information (201), each cyphering key (202) and the cyphered element of digital information (201) have the same size.

In a preferred embodiment of the device of the present invention, the computational means are further configured for ciphering with n ciphering keys (202), and the communication means are further configured for transmitting each of the ciphered element of digital information (203) and said n ciphering keys (202) to n+1 different domains, n consisting of an integer greater than 0.

Embodiments

Several embodiments of the objects of the present invention are subsequently described.

Client devices (3), which run in independent nodes, perform ciphering steps on their own, and subsequently transmit such information to entrusted domains (2) (204). Hence, the element of digital information (201) is ciphered in a trusted device, which is the client device (3) itself. Such client device is accessed by a user wishing to store securely his/her information.

Upon a so-called write request, of creation or modification of an element of digital information (data) the client device ciphers the elements of digital information (turning them into cipher texts). The ciphered element of digital information (203) and ciphering keys (202) are then transmitted, by the communication means, to the domains/storage backends.

Upon a read request for an element of digital information (201), a client device provides the correct credentials, that means, said username and associated password, before the several domains, thereby obtaining the set of ciphered element of digital information (203) and ciphering keys (202), and thus deciphering the ciphered element of digital information (203) back into an element of digital information (201).

The above described embodiments are combinable.

The term "comprising" whenever used in this document is intended to indicate the presence of stated features, integers, steps, components, but not to preclude the presence or addition of one or more other features, integers, steps, components or groups thereof.

As will be apparent to a person with ordinary skill in the art, the present invention should not be limited to the embodiments described herein, and such person will foresee various modifications within the scope of the present invention.

The claims establish further specific embodiments of the disclosure.

The invention claimed is:

1. A method for secure storage of at least one element of digital information, the method comprising the steps of:
   i) ciphering with n ciphering keys the at least one element of digital information into a ciphered element of digital information, wherein n is an integer greater than 1, and wherein the ciphering includes ciphering the at least one element of digital information with at least two pseudo-random keys that each include a pseudo-random bit stream, wherein a first pseudo-random key ciphers the element of digital information by performing an exclusive-OR operation between the at least one element of digital information and the first pseudo-random key, and wherein any subsequent pseudo-random key ciphers the result of the ciphering with the previous pseudo-random key by performing an exclusive-OR operation between the result of the ciphering with the previous pseudo-random key and the second pseudo-random key; and
   ii) transmitting the resultant ciphered element of digital information and the n ciphering keys to n+1 different domains selected from a plurality of domains for subsequent storage, wherein the resultant ciphered element of digital information and the n ciphering keys are transmitted to different distinct domains,
   wherein, for each element of digital information, at least one metadata element is generated that includes at least one additional element of information indicating a creation or modification action of such element of digital information.

2. The method according to claim 1, wherein the exclusive-OR operation is performed in each bit of the element of digital information with a ciphering key or the resulting ciphered element of digital information with a previous ciphering key with bits from the subsequent ciphering key.

3. The method according to claim 1, wherein each ciphering key that includes a pseudo-random bit stream is used a single time.

4. The method according to claim 1, wherein each metadata element is associated with a unique identifier associated with a username and a corresponding device identifier, the device identifier including an identifier of a device which generated or altered an element of digital information.

5. The method according to claim 4, wherein each metadata element is ciphered with the n ciphering keys to generate a ciphered metadata element, the ciphered metadata element being subsequently transmitted to a domain from the plurality of domains for subsequent storage.

6. The method according to claim 5, wherein access to:
   a ciphered element of digital information stored in a domain, corresponding to an element of digital information, and
   the metadata element corresponding to an element of digital information,
   is provided via an access identifier.

7. The method according to claim 6, wherein the access identifier is associated with the username which is part of the unique identifier and a corresponding password.

8. The method according to claim 1 wherein steps i) and ii) are performed in a trusted device, and wherein the plurality of domains includes of a plurality of untrusted domains.

9. The method according to claim 1, wherein the element of digital information, each of the cyphering keys, and the cyphered element of digital information have the same size.

10. The method according to claim 1, wherein the at least one metadata element is not used to decipher the resultant ciphered element of digital information.

11. A device for secure storage of at least one element of digital information, the device comprising:
    i) a computing device configured to cipher the at least one element of digital information with n ciphering keys to generate a ciphered element of digital information, wherein n is an integer greater than 1, and wherein the ciphering includes ciphering the at least one element of digital information with at least two pseudo-random keys that each include a pseudo-random bit stream, wherein a first pseudo-random key ciphers the element of digital information by performing an exclusive-OR operation between the at least one element of digital information and the first pseudo-random key, and wherein any subsequent pseudo-random key ciphers the result of the ciphering with the previous pseudo-random key by performing an exclusive-OR operation between the result of the ciphering with the previous pseudo-random key and the second pseudo-random key; and ii) a communication device configured to transmit the n ciphering keys and the resultant ciphered element of digital information to n+1 different domains selected from a plurality of domains for subsequent storage, wherein the communication device is further configured to transmit the resultant ciphered element of digital information and the n ciphering keys to different distinct domains, wherein, for each element of digital information, at least one metadata element is generated that includes at least one additional element of information indicating a creation or modification action of such element of digital information.

12. A system for secure storage of at least one element of digital information of a client, the system comprising:

at least one client device that includes the device of claim 11; and a plurality of domains configured to store the ciphered element of digital information and the n ciphering keys, wherein the plurality of domains includes untrusted domains.

* * * * *